United States Patent Office 2,827,464
Patented Mar. 18, 1958

2,827,464

CHLORINATION OF VAT DYESTUFFS

Armin Caliezi, Basel, and Walter Kern, Sissach, Switzerland, assignors to Ciba Limited, Basel, Switzerland, a Swiss firm No Drawing. Application May 23, 1955
Serial No. 510,532

Claims priority, application Switzerland May 26, 1954

17 Claims. (Cl. 260—275)

Many processes are known by which halogen atoms can be introduced into organic compounds. In most of these processes free halogen is used, for example, chlorine or such products as sulfuryl chloride which behave like a mixture of sulfur dioxide and free chlorine, but serious drawbacks are encountered in many cases in that, for example, the reaction proceeds very slowly when carried out on a large scale, or in that the free halogen or the hydrogen halide which forms during the reaction considerably corrodes the appartus used, particularly when the reaction does not take the desired course unless carried out under severe conditions. Moreover, accurate proportions of the reaction participants are diffcult to attain in view of the volatility of the usual halogenating agents; in many cases the halogenation must be controlled continuously. Frequently, the halogenation products of different batches differ from one another in constitution. The use of sulfuryl halides or thionyl halides in the presence of aluminum chloride is known to lead to halogenation products with a considerable sulfur content which may exert a detrimental influence on the properties of dyestuffs, especially of vat dyestuffs.

It has now been found that cyclic compounds containing cyclically bound carbonyl groups and also containing at least nine, at least partially condensed aromatic six-membered rings can be advantageously halogenated by heating them in an anhydrous chlorinating agent containing, on the one hand, a compound of the Friedel-Crafts type and, on the other hand, sulfur trioxide or a compound of the general formula R—SO$_2$-halogen, wherein R stands for one of the groups —OH and —O-metal, or an organic radical.

In the instant case, "cyclic carbonyl compounds" means such as contain at least one carbon atom as a ring member, preferably of an aromatic six-membered ring, which carbon atom is linked to an oxygen atom by a double bond. The starting materials used in the process of this invention contain at least nine aromatic six-membered rings, and these must be fused, at least partially, either with one another or with heterocyclic rings. Suitable carbonyl compounds are, for example, those which contain only ring systems with at least three condensed rings, each ring system having at least one carbonyl group, in other words, starting materials containing no benzene or naphthalene radicals attached to other rings by simple bonds.

For the rest, carbonyl compounds of a great variety of constitutions can be used, as for example the following:

(a) Carbonyl compounds containing two benzanthrone radicals, especially dibenzanthrones or isodibenzanthrones.

(b) Anthrimides or carbazoles with at least two —NH-bridges or carbazole rings, or compounds with at least two —NH-bridges, part of which are simple anthrimide bridges and part are members of carbazole rings. Those anthrimides and carbazoles may also be mentioned here which are condensed with further rings, especially benzene or naphthalene acridone rings.

(c) Compounds obtained by alkaline condensation from benzanthrones whose anthrone radical is linked to at least one anthraquinonylamino group and also in Bz-1-position by way of an —NH-bridge to a vattable radical. Such condensation products are described, e. g. in U. S. Patent 1,845,469, patented February 16, 1932, by Hugo Wolff et al., there may be mentioned here in particular the products obtainable from 6,Bz-1-di-(α-anthraquinonylamino) - benzanthrones. Furthermore, condensation products obtained from 6-α-anthraquinonylamino-Bz-1-pyrazolanthronyl-benzanthrones can also be used.

(d) Anthraquinonylaminoacedianthrones, for example the condensation product obtainable from monobromacedianthrone and 1-aminoanthraquinone.

The starting materials mentioned under (a) to (d) may contain further substituents, especially substituents usually present in vat dyestuffs, for example, low molecular alkyl or alkoxyl groups, halogen atoms, or sulfo, amino or nitro groups. Many of the starting materials suitable for the present process are known or can be made by known methods.

In general the said starting materials for the present process are high molecular vat dyestuffs or vat dyestuff intermediates that are in principle capable of being halogenated but are mostly somewhat difficult to halogenate.

Compounds of the Friedel-Crafts type which can be used are, for example boron trifluoride, or its complex salts, titanium tetrachloride, zirconium tetrachloride, tin tetrachloride and zinc chloride, as well as the trihalides of iron or aluminum, such as e. g. aluminum chloride, aluminum bromide and ferric chloride, frequently used as compounds of the kind mentioned. In certain cases, mixtures of the said compounds may also prove useful.

As compounds of the general formula R—SO$_2$-halogen, there may be used for example chlorosulfonic acid and fluorosulfonic acid and metal salts thereof, for instance their sodium salts. Surprisingly, simple organic sulfonic acid chlorides which themselves are not easy to chlorinate, especially alkanesulfonic acid chlorides with an alkyl radical of at the most 4 carbon atoms, such as methane sulfonic acid chloride, have a similar effect. As a rule, sulfur trioxide, or sulfuric acid containing a large proportion of sulfur trioxide (oleum) can likewise be used, especially when it is possible under the reaction conditions that compounds of the above formula R—SO$_2$-halogen are formed from it.

It is useful in many cases to add to the anhydrous chlorinating agent of the constitution mentioned substances which lower the melting temperature, for example sodium chloride, sodium fluoride, calcium chloride, potassium chloride, sulfur dioxide, sodium sulfite, or magnesium sulfate.

The chlorinating agent can be obtained by simple mixing of the substances mentioned, it being unknown whether in some cases the constituents of the mixture react with each other before the chlorinating reaction sets in. It is appropriate in many cases to add the compounds of the formula R—SO$_2$-halogen to the solid or molten compound of the Friedel-Crafts type because the stirrability of the melts is thus often increased. It is also possible in many cases to introduce the compound to be chlorinated into a melt of a compound of the Friedel-Crafts type and advantageously prepared with the substances mentioned above, and to add the sulfur trioxide or the compound of the formula R—SO$_2$-halogen as the last component. Finally, all the reaction participants may as well be mixed from the outset.

A halogenating agent which was found to be particularly suitable for the instant process is a mixture of an aluminum halide, especially aluminum chloride, and a halogen sulfonic acid, such for example as fluorosulfonic acid, particularly chlorosulfonic acid.

The relative proportions of the carbonyl compound, aluminum halide, $SO_3$ or R—$SO_2$-halogen, especially halogen sulfonic acid and the substance lowering the melting point may vary within wide limits. Depending on the quantity of halogen sulfonic acid used in proportion to the carbonyl compound, the action is stronger or weaker. In the case of aluminum halide it is of advantage to use at least twice the weight of the carbonyl compound and in most cases an even considerably larger quantity of aluminum halide is recommended. The quantity of the substance added to lower the melting point is proportioned in known manner to the aluminum halide present.

In order that the melt is sufficiently thinly fluid and easily stirrable at the temperatures favorable for the present process, it is of advantage to use at least one mol, but preferably much more, e. g. about 8 mols of aluminum halide per mol of halogen sulfonic acid. Favorable results are obtained in many cases with mixtures containing per part of chlorosulfonic acid at least 4 to 5 parts, but not considerably more than 10 parts, of anhydrous aluminum chloride.

The chlorination must be carried out in an anhydrous meduim.

The reaction temperature is limited by the fact that many melts are badly or hardly stirrable at temperatures somewhat below 60° C. A critical upper limit does not appear to exist. However, at temperatures considerably above 140° C. dyestuffs with inferior properties are obtained in many cases. The present process is therefore advantageously carried out at temperatures above 70° C., preferably between 85 and 135° C. The reaction period up to the practical termination of the action of the sulfur trioxide or the compound of the formula R—$SO_2$-halogen on the carbonyl compound is usually 1 to 3 hours in the case of chlorosulfonic acid and aluminum chloride. In many cases the reaction is complete already after one hour.

Surprisingly, the present process can be conducted in such manner that, despite the presence of compounds having a vigorous sulfonating action, no sulfur or sulfonic acid groups enter into the molecule. The sulfur trioxide or the compound of the formula R—$SO_2$-halogen nevertheless plays an important role in the halogenating reaction as can be seen from the fact that, per molecule of R—$SO_2$-halogen or per molecule of sulfur trioxide, one halogen atom can usually be introduced into the compound to be halogenated.

The reaction mechanism of the halogenation can probably be represented by the Equations 1 and 2 involving a complex salt formation, but the invention should not be limited by any theory.

(1)
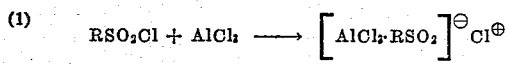

(2)
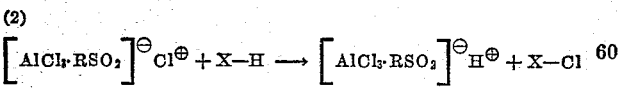

R represents one of the groups —OR or —O-metal, or an organic radical, and X—H the compound to be halogenated.

Since in the anhydrous, liquid halogenating agent free halogen is never present, the reaction can be carried out practically without any harmful effect on the apparatus. It is a further advantage that the halogenation in many cases takes only 1 to 2 hours.

Another advantage of the process consists in the fact that the low volatility of the halogenating agents used, unlike the usual halogenating agents, makes it possible to use accurate weights and thus to obtain homogeneous halogenation results. Moreover, simpler apparatus can be used and, finally, the process makes it possible in many cases to work at lower temperatures than are necessary when the conventional halogenating agents are use.

If the molecule of the compound to be halogenated is such that, for example, intramolecular condensation or another kind of cyclization, e. g. carbazolization, is possible, such condensation or ring closure can in many cases be effected in addition to the halogenation reaction.

In general, the products obtained are valuable vat dyestuffs or if, as e. g. certain anthrimides, they do not fully meet modern requirements as to vattability, affinity or fastness properties, they can be converted into such valuable vat dyestuffs (e. g. by carbazolation of the anthrimides). The vat dyestuffs can be used in the usual manner for dyeing or printing a wide variety of materials, especially for dyeing or printing cellulosic fibers, such as cotton, rayon, and staple fibers of regenerated cellulose. In many cases, the dyeings obtained are particularly fast to chlorine. The tinctorial properties of the end products of the present process are in many cases superior as compared to those of the starting materials or known products made from such starting materials with agents which, apart from causing halogenation, cause sulfur to enter into the molecule, that is to say, as compared with dyestuffs obtained when products obtained by subjecting 6,Bz-1-di-(α-anthraquinonylamino)-benzanthrones to the action of an alkaline condensing agent are treated with thionyl chloride and aluminum chloride.

The following examples illustrate the invention, the parts being parts by weight and the percentages being percentages by weight.

*Example 1*

A mixture of 80 parts of anhydrous aluminum chloride, 13 parts of sodium chloride and 0.8 part of sodium fluoride is heated to 150° C. until a homogeneous melt is formed. The latter is allowed to cool to 90° C. and 5 parts of chloro-sulfonic acid are added dropwise at this temperature. 5 parts of dibenzanthrone are then introduced at 87 to 90° C. and the mixture is stirred for 1 hour at 87 to 90° C. The melt is poured on to ice and water, rendered acid to Congo with hydrochloric acid, heated to 90° C., filtered, the residue washed neutral and dried.

About 6.1 part of a blue-black powder are obtained which dyes cotton full, pure, violet blue tints of good fastness properties. The chlorine content of the product amounts to 20%.

*Example 2*

A mixture of 400 parts of anhydrous aluminum chloride, 65 parts of sodium chloride, and 4 parts of sodium fluoride is heated at 200° C. until a homogeneous melt is formed. This is allowed to cool to 98° C. and 50 parts of chloro-sulfonic acid are added in the course of 40 minutes, and then 50 parts of the dyestuff of the formula

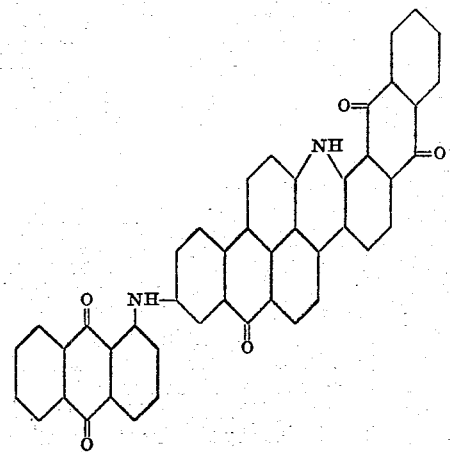

prepared according to Example 1 of U. S. Patent 1,845,469, patented February 16, 1932, by Hugo Wolff et al. in the course of 20 minutes. When this operation is complete the mixture is stirred for one hour at 98–103° C. and the same procedure is followed as in Example 1. The yield amounts to about 56.6 parts.

The dyestuff is a black-green powder and dyes cotton pure olive tints having excellent fastness properties. It contains about 16.6% chlorine.

If only half of the above quantity of chloro-sulfonic acid is used (25 parts), a product is obtained with a chlorine content of about 9.8%.

*Example 3*

A mixture of 100 parts of anhydrous aluminum chloride, 16 parts of sodium chloride and 20 parts of chlorosulfonic acid is heated at 120° C. until an easily stirrable melt is formed. The temperature of the melt is then allowed to drop to 90° C. and 10 parts of the dyestuff prepared according to Example 1 of U. S. Patent 1,845,469, patented February 16, 1932, by Hugo Wolff et al. whose formula is given in Example 2 are added at 90–92° C. The mixture is then stirred for one hour at 90–92° C. and worked up as described in Example 1. About 12.4 parts are obtained.

The dyestuff produces similar effects to those described in Example 2. Its chlorine content amounts to about 21.6%.

*Example 4*

A mixture of 80 parts of aluminum chloride, 13 parts of sodium chloride and 10 parts of chloro-sulfonic acid is liquefied by introducing a current of sulfur dioxide at 88° C. At this temperature 10 parts of the dyestuff prepared according to Example 1 of U. S. Patent 1,845,469, patented February 16, 1932, by Hugo Wolff et al., whose formula is given in Example 2 are added and the mixture is stirred for one hour at 88–89° C. The procedure for working up is the same as described in Example 1.

10.9 parts of a dyestuff having similar dyeing effects to that of Example 2 are obtained. The chlorine content amounts to about 14.5%.

*Example 5*

10 parts of the starting material used in Example 2 are introduced at 120° C. into a melt consisting of 80 parts of aluminum chloride, 13 parts of sodium chloride and 0.8 part of sodium fluoride, and the mixture is stirred for one hour at 120–125° C. until carbazolization is complete. The melt is then cooled to 100° C., 12 parts of sodium chloro-sulfonate are added and the melt is stirred for another hour at 95–100° C. After working up, a vat dyestuff is obtained which dyes cotton bluish olive tints which have very good fastness properties. The chlorine content amounts to about 12%.

*Example 6*

4.2 parts of methane-sulfochloride are added dropwise at 90–95° C. to a melt consisting of 80 parts of aluminum chloride, 13 parts of sodium chloride and 0.8 part of sodium fluoride. 5 parts of the starting material used in Example 2 are then added. The melt is then stirred for 45 minutes at 90–95° C. and working up is the same as described in Example 1. The product contains about 13% of chlorine and has similar dyeing properties to the dyestuff of Example 2.

*Example 7*

A mixture of 80 parts of aluminum chloride, 16 parts of sodium chloride, 0.8 part of sodium fluoride and 11 parts of fuming sulfuric acid (66%) is heated to 140° C. until a homogeneous melt is formed. The melt is cooled to 100° C. and 10 parts of the dyestuff prepared according to Example 1 of U. S. Patent 1,845,469, patented February 16, 1932, by Hugo Wolff et al. whose formula is given in Example 2 are added. The melt is stirred for one hour at 98–103° C. and worked up in the usual manner. A vat dyestuff free from sulfur is obtained having a chlorine content of about 17% which dyes cotton a yellowish olive tint having excellent fastness properties.

*Example 8*

If, instead of fuming sulfuric acid, 11.9 parts of sodium chlorosulfonate are used in Example 7, a product having similar properties is obtained.

*Example 9*

A mixture of 100 parts of aluminum chloride and 40 parts of chlorosulfonic acid is heated for 3 hours at 160° C. The melt is then cooled to 100° C. and 10 parts of the dyestuff prepared according to Example 1 of U. S. Patent 1,845,469, patented February 16, 1932, by Hugo Wolff et al. whose formula is given in Example 2 are added. The mixture is heated to 120° C. and stirred at this temperature for one hour. After working up in the usual manner, a product having a chlorine content of about 20% is obtained which dyes cotton pure olive tints with excellent fastness properties.

*Example 10*

5 parts of the starting product used in Example 2 are added to a melt consisting of 80 parts of aluminum chloride, 13 parts of sodium chloride, 0.8 part of sodium fluoride and 5 parts of fluorosulfonic acid. The melt is stirred for one hour at 98–103° C. After working up, a vat dyestuff is obtained which dyes in olive tints having similar properties to those described in Example 2.

*Example 11*

5 parts of methane sulfochloride and then 5 parts of dibenzanthrone are added at 90° C. to a melt consisting of 80 parts of aluminum chloride, 13 parts of sodium chloride and 0.8 part of sodium fluoride. The melt is then stirred for one hour at 90–95° C. and worked up in the usual manner. A product dyeing in violet blue tints is obtained which contains about 3 atoms of chlorine per mol of dibenzanthrone.

When iso-dibenzanthrone is used, a similar product is obtained which dyes cotton a somewhat more violet tint.

*Example 12*

80 parts of aluminum chloride, 13 parts of sodium chloride, 0.8 part of sodium fluoride and 10 parts of chlorosulfonic acid are heated to 140° C. until a clear melt is formed. This is cooled to 100° C. and 10 parts of iso-dibenzanthrone are added. The temperature is maintained for one hour at 98–103° C. and the product is worked up as described in Example 1. The resulting product contains about 22% chlorine.

*Example 13*

If in Example 12 instead of using iso-dibenzanthrone the dyestuff of the formula

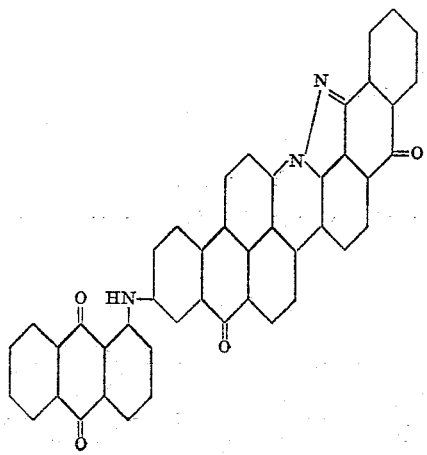

prepared according to Example 1 of British Patent 345,728 is used, a product is obtained which dyes cotton bluish olive and has a chlorine content of about 17.5%.

Example 14

A mixture of 80 parts of aluminum chloride, 13 parts of sodium chloride, 0.8 part of sodium fluoride and 5 parts of fluorosulfonic acid is heated at 140° C. until a clear melt is formed. After cooling to 100° C. 5 parts of iso-dibenzanthrone are added and the mixture is heated for one hour at 98–103° C. After working up, a product is obtained which dyes cotton violet tints and contains about 22% of chlorine.

If dibenzanthrone is used instead of iso-dibenzanthrone, a dyestuff is obtained which contains chlorine and dyes cotton blue-violet tints.

Example 15

20 parts of the starting material used in Example 2 are added at 100° C. to a melt consisting of 120 parts of aluminum chloride, 40 parts of titanium tetrachloride, 20 parts of sodium fluoride and 20 parts of chlorosulfonic acid. The mixture is stirred for one hour at 100–110° C. and then put on to sufficient ice that the temperature of the aqueous solution never exceeds 20° C. The mixture is acidified with hydrochloric acid and stirred for one hour at 0–20° C. The dyestuff is then filtered off, washed neutral and dried. It contains about 16% of chlorine and dyes cotton yellowish olive tints.

Example 16

10 parts of the black dyestuff obtained by condensing 1 mol of tetrabromopyranthrone with 3½ mols of aminodibenzanthrone and ½ mol of α-amino-anthraquinone are added at 100° C. to a melt consisting of 80 parts of aluminum chloride, 13 parts of sodium chloride and 10 parts of chlorosulfonic acid. The whole is stirred for one hour at 98–103° C. The resulting product has a chlorine content of about 25% and dyes cotton grey tints.

Example 17

5 parts of the tetranthrimide obtained by condensing 4:4'-diamino-1:1'-dianthrimide with 2 mols of 1-chloro-anthraquinone are added at 90° C. to a melt of 100 parts of aluminum chloride, 20 parts of sodium chloride, 1 part of sodium fluoride and 17 parts of chlorosulfonic acid. The temperature is maintained for three hours at 90° C. The melt is then heated to 120° C. and kept at that temperature for 2½ hours. The product obtained after working up in the usual manner contains about 28% of chlorine.

Example 18

5 parts of the tetranthrimide-monocarbazole of the formula

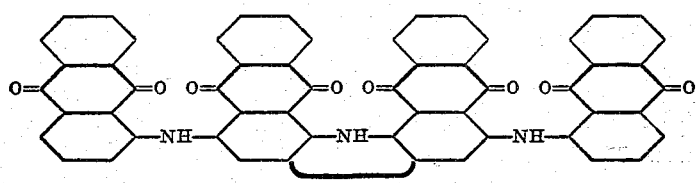

obtained by condensing 4:4'-diamino-1:1'-dianthrimide-carbazole with 2 mols of 1-chloro-anthraquinone are added at 90° C. to a melt consisting of 100 parts of aluminum chloride, 20 parts of sodium chloride, 1 part of sodium fluoride and 9 parts of chlorosulfonic acid. The whole is heated in the course of two hours to 120° C. and this temperature is maintained for an hour. The temperature of the melt is then raised to 160° C. and maintained for one hour at 160–162° C. After working up, a vat dyestuff is obtained which dyes cotton grey and has a chlorine content of about 23%.

Example 19

10 parts of 1:4:1':1''-trianthrimide-carbazole of the formula

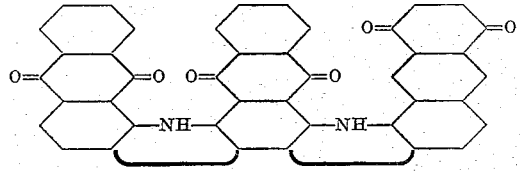

(cf. British Patent 297,133) are added at 90° C. to a melt of 200 parts of aluminum chloride, 40 parts of sodium chloride, 2 parts of sodium fluoride and 18 parts of chlorosulfonic acid. The whole is heated for 3 hours at 90° C., one hour at 120° C. and one hour at 140° C. After working up, a product is obtained which contains about 26% of chlorine.

Example 20

7 parts of the tetranthrimide-carbazole obtained by carbazolizing the starting product of Example 18 with aluminum chloride and pyridine are added at 100° C. to a melt consisting of 150 parts of aluminum chloride, 30 parts of sodium chloride, 1.5 parts of sodium fluoride and 7.6 parts of chloro-sulfonic acid. The temperature is then raised in the course of 6 hours to 160° C., the mixture is stirred for one hour at 160° C. and the melt poured on to ice and water. After working up, a grey vat dyestuff is obtained having a chlorine content of about 21%.

Example 21

3 parts of the pentanthrimide-carbazole of the formula

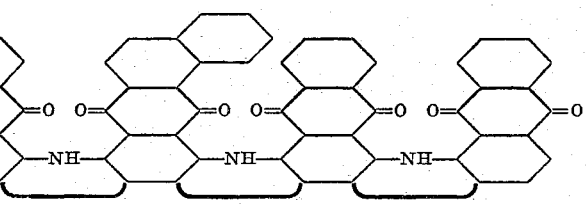

obtained according to Example 1 of British Patent 660,391 are treated at 100–120° C. in a melt consisting of 50 parts of aluminum chloride, 10 parts of sodium chloride, 0.5 part of sodium fluoride and 5.2 parts of chlorosulfonic acid for one hour. A grey vat dyestuff is obtained containing about 14% of chlorine.

Example 22

1 part of the condensation product from 1 mol of 2:7-dichloranthraquinone and 2 mols of amino-acedi-anthrone is added at 90° C. to a melt consisting of 30 parts of aluminum chloride, 6 parts of sodium chloride, 0.3 part of sodium fluoride and 1.3 parts of chlorosulfonic acid. The whole is heated for 30 minutes at 100° C. and for 30 minutes at 120° C. After working up in the usual manner, a brown vat dyestuff is obtained containing about 22% of chlorine.

*Example 23*

1.5 parts of the dyestuff obtained according to the first paragraph of Example 2 are vatted with 6 parts by volume of a solution of 30% strength of sodium hydroxide and 3 parts of sodium hydrosulfite in 100 parts of water at 40–50° C. This stock vat is added to a dyebath containing in 2000 parts of water 6 parts by volume of a sodium hydrosulfite, and 100 parts of cotton are entered at 40° C. After 15 minutes 20 parts of sodium chloride are added and dyeing is carried on for one hour at 40–50° C. The cotton is then squeezed out, oxidized and finished as usual. It is dyed a fast olive tint.

The same dyestuff can be used with very good results for dyeing according to the known process from a strongly alkaline vat at about 60° C. without adding sodium chloride.

What is claimed is:

1. A process for the manufacture of chloroaryl compounds, which comprises heating at a temperature above 60° C. a cyclic carbonyl compound containing at least nine, at least partly condensed aromatic six-membered rings in an anhydrous chlorinating agent which contains on the one hand aluminum chloride and on the other hand a member selected from the group consisting of sulfur trioxide and a compound of the general formula RSO₂-halogen, in which formula R represents a member selected from the class consisting of the groups OH—, O-metal and an organic radical, at least one mol of aluminum chloride being used per mol of the compound of the formula R—SO₂-halogen.

2. A process for the manufacture of chloroaryl compounds, which comprises heating at a temperature above 60° C. a cyclic carbonyl compound containing at least nine, at least partly condensed aromatic six-membered rings in an anhydrous chlorinating agent which contains on the one hand aluminum chloride and on the other hand chlorosulfonic acid, at least one mol of aluminum chloride being used per mol of chlorosulfonic acid.

3. A process for the manufacture of chloroaryl compounds, which comprises heating at a temperature above 60° C. a cyclic carbonyl compound containing at least nine, at least partly condensed aromatic six-membered rings in an anhydrous chlorinating agent which contains on the one hand aluminum chloride and on the other hand methane sulfonic acid chloride, at least one mol of aluminim chloride being used per mol of methane sulfonic acid halide.

4. A process for the manufacture of chloroaryl compounds, which comprises heating at a temperature above 60° C. a cyclic carbonyl compound containing at least nine, at least partly condensed aromatic six-membered rings in an anhydrous chlorinating agent which contains on the one hand anhydrous aluminum chloride and on the other hand a halogensulfonic acid in the presence of an inorganic agent lowering the melting point, at least one mol of aluminum chloride being used per mol of the halogen sulfonic acid.

5. A process for the manufacture of chloroaryl compounds, which comprises heating at a temperature above 60° C. a cyclic carbonyl compound containing at least nine, at least partly condensed aromatic six-membered rings in an anhydrous chlorinating agent which contains on the one hand anhydrous aluminum chloride and on the other hand a halogensulfonic acid in the presence of an alkali metal halide, at least one mol of aluminum chloride being used per mol of halogen sulfonic acid.

6. A process for the manufacture of chloroaryl compounds, which comprises heating at a temperature above 60° C. a cyclic carbonyl compound containing at least nine, at least partly condensed aromatic six-membered rings in an anhydrous chlorinating agent which contains on the one hand anhydrous aluminum chloride and on the other hand sulfur trioxide, in the presence of an alkali metal halide, at least one mol of aluminum chloride being used per mol of sulfur trioxide.

7. A process for the manufacture of chloroaryl compounds, which comprises heating at temperatures between 85 and 135° C. a cyclic carbonyl compound containing at least nine, at least partly condensed aromatic six-membered rings in an anhydrous chlorinating agent which contains on the one hand anhydrous aluminum chloride and on the other hand chlorosulfonic acid, in the presence of an alkali metal halide at least one mol of aluminum chloride being used per mol of chlorosulfonic acid.

8. A process for the manufacture of chloroaryl compounds, which comprises heating at a temperature above 60° C. a cyclic carbonyl compound containing at least nine aromatic six-membered rings which compound contains only ring systems with at least three condensed rings, each ring system containing at least one carbonyl group, in an anhydrous chlorinating agent which contains on the one hand anhydrous aluminum chloride and on the other hand a member selected from the group consisting of sulfur trioxide and a compound of the general formula RSO₂-halogen, in which formula R represents a member selected from the class consisting of the groups OH—, O-metal and an organic radical, at least one mol of aluminum chloride being used per mol of the compound of the formula RSO₂-halogen.

9. A process for the manufacture of chloraryl compounds, which comprises heating at temperatures between 85 and 135° C. a cyclic carbonyl compound containing at least nine aromatic six-membered rings which compound contains only ring systems with at least three condensed rings, each ring system containing at least one carbonyl group, in an anhydrous chlorinating agent which contains on the one hand anhydrous aluminum chloride and on the other hand chlorosulfonic acid, in the presence of an alkali metal halide at least one mol of aluminum chloride being used per mol of chlorosulfonic acid.

10. A process for the manufacture of chloroaryl compounds, which comprises heating at temperatures between 85 and 135° C. a dibenzanthrone in an anhydrous chlorinating agent which contains aluminum chloride and chlorosulfonic acid in the presence of an alkali metal halide at least one mol of aluminum chloride being used per mol of chlorosulfonic acid.

11. A process for the manufacture of chloroaryl compounds, which comprises heating at temperatures between 85 and 135° C. a dibenzanthrone in an anhydrous chlorinating agent which contains aluminum chloride and sulfur trioxide in the presence of an alkali metal halide at least one mol of aluminum chloride being used per mol of sulfur trioxide.

12. A process for the manufacture of chloroaryl compounds, which comprises heating at temperatures between 85 and 135° C. a cyclic carbonyl compound containing at least nine aromatic six-membered rings and containing only ring systems with at least three condensed rings which ring systems are connected by at least two bridges of the type selected from the group consisting of an —NH—bridge and a carbazole ring and which ring systems has at least one carbonyl groups, in an anhydrous chlorinating agent which contains aluminum chloride and chlorosufonic acid in the presence of an alkali metal halide at least one mol of aluminum chloride being used per mol of chlorosulfonic acid.

13. A process for the manufacture of chloroaryl compounds, which comprises heating at temperatures between 85 and 135° C., a cyclic carbonyl compound obtainable by alkaline condensation of a benzanthrone whose anthrone radical is bound to at least one anthraquinonyl amino group and which benzanthrone is further bound in Bz-1-position by an —NH— group to a vattable radical, in an anhydrous chlorinating agent which contains aluminum chloride and chlorosulfonic acid in the ratio of at least one mol of aluminum chloride per mol of chlorosulfonic acid.

14. A process for the manufacture of chloroaryl compound, which comprises heating at temperatures between 85 and 135° C. a cyclic carbonyl compound obtainable by alkaline condensation of a 6,Bz-1-di-α-anthraquinonylamino anthraquinone in an anhydrous chlorinating agent which contains aluminum chloride and chlorosulfonic acid in the ratio of at least one mol of aluminum chloride per mol of chlorosulfonic acid.

15. A process for the manufacture of chloroaryl compounds, which comprises heating at temperatures between 85 and 135° C. a cyclic carbonyl compound obtainable by alkaline condensation of a 6,Bz-1-di-α-anthraquinonylamino anthraquinone in an anhydrous chlorinating agent which contains aluminum chloride and sulfur trioxide in the presence of an alkali metal halide at least one mol of aluminum chloride being used per mol of sulfur trioxide.

16. A process for the manufacture of chloroaryl compounds, which comprises heating at temperatures between 85 and 135° C. a cyclic carbonyl compound obtainable by alkaline condensation of a 6-α-anthraquinonylamino-Bz-1-pyrazolanthranyl-benzanthrone in an anhydrous chlorinating agent which contains aluminum chloride and chlorosulfonic acid in the presence of an alkali metal halide at least one mol of aluminum chloride being used per mol of chlorosulfonic acid.

17. A process for the manufacture of chloroaryl compounds, which comprises heating at temperatures between 85–135° C. and anthraquinonylaminoacedianthrone in an anhydrous chlorinating agent which contains aluminum chloride and chlorosulfonic acid in the presence of an alkali metal halide at least one mol of aluminum chloride being used per mol of chlorosulfonic acid.

References Cited in the file of this patent

UNITED STATES PATENTS

| | | |
|---|---|---|
| 1,845,469 | Wolff et al. | Feb. 16, 1932 |
| 1,846,122 | Kunz et al. | Feb. 23, 1932 |
| 2,677,693 | Nawiasky | May 4, 1954 |

UNITED STATES PATENT OFFICE
CERTIFICATE OF CORRECTION

Patent No. 2,827,464                                             March 18, 1958

Armin Caliezi et al.

It is hereby certified that error appears in the printed specification of the above numbered patent requiring correction and that the said Letters Patent should read as corrected below.

Column 1, line 24, for "appartus" read -- apparatus --; column 3, line 26, for "meduim" read -- medium --; column 4, line 46, for "part" read -- parts --; column 10, line 64, for "has" read -- have --; same line, for "groups" read -- group --; column 11, line 6, for "pound" read -- pounds --; column 12, line 11, for "and" read -- an --.

Signed and sealed this 5th day of August 1958.

(SEAL)
Attest:

KARL H. AXLINE
Attesting Officer

ROBERT C. WATSON
Commissioner of Patents